(12) United States Patent
Patterson (10) Patent No.: US 6,171,504 B1
(45) Date of Patent: Jan. 9, 2001

(54) MAGNETIC WATER CONDITIONER

(76) Inventor: A. Steven Patterson, 1510 Lake St., Gastonia, NC (US) 28052

( * ) Notice: Under 35 U.S.C. 154(b), the term of this patent shall be extended for 0 days.

(21) Appl. No.: 08/408,688

(22) Filed: Mar. 21, 1995

(51) Int. Cl.⁷ ........................................................ C02F 1/48
(52) U.S. Cl. ........................................... 210/695; 210/222
(58) Field of Search ..................................... 210/222, 695

(56) References Cited

U.S. PATENT DOCUMENTS

| | | | |
|---|---|---|---|
| 2,652,925 | 9/1953 | Vermeiren | 210/222 |
| 4,265,754 | 5/1981 | Menold | 210/222 |
| 4,265,755 | 5/1981 | Zimmerman | 210/222 |
| 4,265,756 | 5/1981 | Schiesser | 210/236 |
| 4,711,271 | 12/1987 | Weisenbarger | 137/827 |
| 4,836,932 | 6/1989 | Walsh | 210/695 |
| 4,956,084 * | 9/1990 | Stevens | 210/232 |
| 5,030,344 * | 7/1991 | Ambrose | 210/222 |
| 5,055,189 * | 10/1991 | Ito | 210/222 |
| 5,101,097 | 3/1992 | Conant | 235/449 |
| 5,113,751 | 5/1992 | Holcomb | 99/286 |
| 5,200,071 | 4/1993 | Spiegel | 210/222 |
| 5,227,683 | 7/1993 | Clair | 310/11 |
| 5,238,558 | 8/1993 | Curtis | 210/222 |
| 5,296,141 | 3/1994 | Ellison | 201/222 |
| 5,378,362 | 1/1995 | Schoepe | 210/222 |

OTHER PUBLICATIONS

Merle Henkenius; *Popular Mechanics*; "Magnetic Water Treatment;" Jun., 1992; pp. 70–72.

David Hasson and Dan Bramson; *Ind. Eng. Chem. Process Des. Dev.*; "Effectiveness of Magnetic Water Treatment in Suppressing $CaCO_3$ Scale Deposition;" vol. 24, No. 3; pp. 588–592; 1985.

* cited by examiner

*Primary Examiner*—Matthew O. Savage
(74) *Attorney, Agent, or Firm*—Dougherty & Clements LLP (57) ABSTRACT

An improved magnetic water or fluid treatment system is provided, consisting of strong magnets arranged in a specific spacial and polar orientation with respect to each other to form a treating device for mounting on fluid-carrying pipes, and which produces a very strong and focused magnetic field. The method of magnetically treating fluids is also disclosed.

19 Claims, 4 Drawing Sheets

MAGNETIC WATER CONDITIONER

FIELD OF THE INVENTION

The present invention relates to a fluid treatment device and method for an improved and highly effective magnetic water treatment device that can be mounted on existing pipes which produces a very strong and focused magnetic field.

BACKGROUND OF THE INVENTION

Magnetic devices were first used in Europe to condition water in the early 1950s after being discovered by a Belgian scientist in 1947. Ventures to sell such devices in the United States initially were not successful in part since the magnets used were of low grade and the claims made by producers regarding the effects of magnetic devices were overstated. The result was bad publicity and considerable skepticism. Since that time, considerable scientific research, engineering research, and anecdotal usage data has concentrated on the effects of magnetism on water and water solutions.

Magnetic Fluid treatment has been shown to suppress the undesirable effects of "scale" and "hard water". While the exact mechanism for this effect is unknown, it is known that $CACO_3$ is the hard tenacious scale (calcite) that forms on most piping systems and especially in systems in which water is heated or evaporated. The scale clogs the passages, reduces heat transfer into the water, and reduces the efficiency of the system. It is also the major contributor to the household phenomenon known as "hard water". Scale itself is not known to be directly affected by a magnetic field.

Some scientific laboratory experiments, which measure $CaCO_3$ deposits and deposition rates, have confirmed that magnetic fields have an affect under the laboratory conditions. These experiments have established a reduction in $CaCO_3$ deposits. The presence of non-calcium ions in water, especially those of iron or magnesium, affects scaling rates and properties. The formation of calcite is inversely related to the heating rate and the temperature with aragonite (soft $CACO_3$) being more likely to form at high temperatures and heating rates. Magnetism can affect some of the physical properties of water through deaggregation, corrosion rates of some materials in contact with water, and some of the properties of materials in water solutions, especially iron ions.

Many changes to the treatment of water can result in temporary scale reduction but may result in a long term increase in the scaling rate. Most of the successful procedures used for reducing the effects of scale are expensive, technical, and may increase the overall rate of corrosion of the system.

Engineering studies made around the world have shown decreases in scaling and increases in plant efficiency as a result of the use of magnetic devices (generally in connection with procedural changes to eliminate the additional sludge formed).

Engineering studies that show positive results commonly find that: a) the effectiveness of magnetic treatment decreases as the temperature at which the scale forms is reduced; b) a greater percentage of aragonite in scale is formed from magnetically exposed water; and c) the scale which forms after exposure to magnetism is softer and easier to remove.

Literally hundreds of industrial, commercial, private and public service providers in the United States have used and profited from magnetic water treatment. Despite their inability to scientifically explain the phenomenon, authors publishing for the American Chemical Society even classify it as a "scale control technique" and identify several manufacturers of devices useful for such treatment. Popular Mechanics in June 1992 reports on many successful applications of magnetic water treatment devices in both commercial and industrial settings. Many of the users to which they allude are very small businesses, not much larger than single home situations.

Presently, scientists dispute the details of the effects of magnetic devices on water and water impurities, but acknowledge that the phenomenon exists and that it merits further study. A model for understanding the phenomena is based on recognizing that magnetic fields impose forces on moving electric charges (ions in the water) and magnetic dipoles (molecular sized magnets). Forces acting on any matter can change its energy state. Water molecules have magnetic moments and are temporarily affected by passing through a magnetic field. This molecular change will relax over time. Most users of magnetic water conditioning devices are more concerned with the effect of the magnetic field of the device on ions. The forces caused by the magnet can provide the activation energy needed by the ions to form new molecular structures and break some other structures. The new structures essentially suspend the impurities in the water in a way that reduces their tendency to precipitate out of solution to form scale on pipes and in devices such as heaters or boiler tubes.

Clearly, the types of impurities in the water are going to affect the type response a system has to exposure to a magnetic device. Because one can not predict what impurities exist in a specific water system, one can not predict the exact results of putting the magnetic water conditioning devices on that system.

However if a system has suffered from build up of scale, installation of the magnetic devices probably will result in a significant reduction in new scaling and generally a removal of the old scale. Scale reduces heat transfer and therefore raises energy costs and often causes premature heating element failure. To keep scale from accumulating, many operators use chemicals. In such systems, the use of magnetic water conditioning can result in a reduction in the amount of chemical used.

Many engineers have used magnetic water treatment successfully to reduce scaling, improve efficiency, and prolong equipment life. A broad range of conditions seems susceptible to successful application of magnetic water treatment devices. Use in processes similar to those which were successful is likely to produce equivalent results and use in systems that are only marginally different from the known successes is a low risk venture.

DESCRIPTION OF THE PRIOR ART
Applicant is aware of the following U.S. Pat. Nos. concerning magnetic water treatment.

| U.S. Pat. No. | Issue Date | Inventor | Title |
| --- | --- | --- | --- |
| 2,652,925 | 09-22-1953 | Vermeiren | MAGNETIC TREATMENT DEVICE FOR LIQUIDS |
| 4,265,754 | 05-05-1981 | Menold | WATER TREATING APPARATUS AND METHODS |

DESCRIPTION OF THE PRIOR ART

Applicant is aware of the following U.S. Pat. Nos. concerning magnetic water treatment.

| | | | |
|---|---|---|---|
| 4,265,755 | 05-05-1981 | Zimmerman | MAGNETIC FLUID TREATING UNIT |
| 4,265,756 | 05-05-1981 | Schiesser | CHANGE DEVICE FOR SIEVES FOR FILTERING PLASTIC MATERIALS |
| 4,711,271 | 12-08-1987 | Weisenbarger | MAGNETIC FLUID CONDITIONER |
| 4,836,932 | 06-06-1989 | Walsh | WATER TREATMENT USING FINE PARTICLE SUPER MAGNETS |
| 5,113,751 | 05-19-1992 | Holcomb | BEVERAGE BREWING SYSTEM |
| 5,200,071 | 04-06-1993 | Spiegel | TRANSLATING MAGNETIC FIELD TREATMENT DEVICE |
| 5,227,683 | 07-13-1993 | Clair | MAGNET ASSEMBLY WITH CONCENTRATOR FOR PROVIDING FLUX LINES PERPENDICULAR TO FLUID FLOW DIRECTION WITHIN STEEL PIPE |
| 5,238,558 | 08-24-1993 | Curtis | MAGNETO-HYDRODYNAMIC FLUID TREATMENT SYSTEM |
| 5,296,141 | 03-22-1994 | Ellison | MAGNETIC WATER CONDITIONER |
| 5,378,362 | 01-03-1995 | Schoepe | APPARATUS FOR MAGNETICALLY TREATING WATER |

PAPERS

| Title | Author |
|---|---|
| MAGNETIC WATER TREATMENT | Merle Henkenius |
| EFFECTIVENESS OF MAGNETIC WATER TREATMENT IN SUPPRESSING CaCO$_3$ SCALE DEPOSITION | David Hasson and Dan Bramson |

Vermeiren U.S. Pat. No. 2,652,925 teaches a treatment device which produces a magnetic field and a passage for the liquid to be treated.

Menold U.S. Pat. No. 4,265,754 provides an apparatus for treating fresh water by producing a magnetic field in proximity to a flow of water within a water conduit.

Zimmerman U.S. Pat. No. 4,265,755 provides a magnetic water treating device within a conduit. This device provides easy assembly without adversely affecting the ultimate functional capability of the overall unit.

Schiesser U.S. Pat. No. 4,265,756 provides a change device for sieves used for filtering plastic materials. The sieves can be changed with this device without interrupting the transport of the material which is being processed.

Weisenbarger U.S. Pat. No. 4,711,271 provides a magnetic fluid conditioner for abating the adherence of precipitates in conduits transmitting a variety of fluids which contain unwanted compounds which will precipitate and adhere to the inner walls of the conduits.

Walsh U.S. Pat. No. 4,836,932 provides a method for the fabrication and use in modifying the physicochemical properties of water. This device uses fine particle super ferromagnets or super paramagnets dispersed in nonmagnetic media.

Holcomb U.S. Pat. No. 5,113,751 provides water treatment by using magnetic treatment or electromagnetic treatment by direct injection in the fluid stream or a combination of such water treatment systems. Note Column 3, lines 33–48, regarding the magnet orientations.

Spiegel U.S. Pat. No. 5,200,071 provides a fluid treatment system for changing the rates of growth of certain crystals formed within a fluid. This device has a variable speed motor and a wheel assembly mounted on the shaft. An array of magnets is concentrically arranged in a circular pattern about the shaft on the inner surface of each of the disks wherein sufficient magnetic force is provided to accomplish beneficial effects on impurities of the fluid.

Clair U.S. Pat. No. 5,227,683 provides a permanent magnet fluid generator with powerful magnetic field condensers which utilize neodymium magnets to magnetically saturate steel pole pieces. In this device, the fluid generates an electrical current that can be utilized to protect the pipe from scale and corrosion.

Curtis U.S. Pat. No. 5,238,558 teaches a magneto-hydrodynamic system and method for the treatment of pipes and the fluid carried in the pipes to prevent scaling and build-up of deposits. In this device, a pipe for carrying fluid and four magnets are utilized, with each magnet having a magnetic field density of about 6,700 gauss, end pole pieces on each end of the magnet units and a top pole piece covering the surface of the magnets on a side of the magnets opposite the side in contact with the pipe to be treated.

Ellison U.S. Pat. No. 5,296,141 provides a magnetic device for treating fluid flowing through a conduit. Permanent magnets are utilized and a mass of non-ferromagnetic filler material in the interior compartment encapsulates the magnets.

Schoepe U.S. Pat. No. 5,378,362 provides a system for treating water to reduce calcium carbonate deposits. Pairs of magnets are utilized to facilitate changing of the spacing between adjacent magnets.

The Merle Henkenius article entitled "MAGNETIC WATER TREATMENT" and the David Hasson and Dan Bramson article entitled "EFFECTIVENESS OF MAGNETIC WATER TREATMENT IN SUPPRESSING CaCO$_3$ SCALE DEPOSITION" discuss the current technology of magnetic water treatment.

SUMMARY OF THE INVENTION

The model for understanding the present invention provides a base for predicting the required physical characteristics for the magnets for the maximum effect. These physical characteristics are strength of the magnetic field, focus of the magnetic field, and the length of time the field can act on the moving solution. As the strength of the magnetic field is increased, the force on the charges and dipoles is increased and the energy is transformed into activation energy in the solution. Stronger magnets are going to yield better results. Since magnetic fields are dispersed in the space around the magnet, even a strong unfocused magnet next to a pipe will result in a relatively weak field inside the pipe where the strength is desired. Properly designed magnets can focus their field so that most of the field strength is inside the pipe. Lastly, since the fluid must be moving, in order to lengthen the time the solution is in a strong magnetic field, the magnet (the field) must be long. Again, properly designed magnets of high strength can accomplish this length.

The present invention relates to a magnetic water treatment device which uses the latest in high tech materials to help ensure that the magnetic field is as strong as is presently technologically feasible. Ceramics are not used. The present invention is set up so that the magnetic field is almost exclusively in the pipe to which it is attached. This magnetic field is spread over several inches of pipe length.

OBJECTS OF THE INVENTION

The principal object of the present invention is to provide an improved method of magnetic fluid treatment.

A further object of this invention is to provide an apparatus for improved magnetic fluid treatment.

Another object of the invention is to provide an apparatus for generating a magnetic field which is strong, focused, and of sufficient length so that the field can act on the moving solution.

Another object of the invention is to provide an apparatus for generating a magnetic field which uses multiple magnets so that the resulting magnetic field can be focused.

Another object of the invention is to provide an apparatus for generating a magnetic field which uses multiple magnets so that the resulting strength of each magnetic field is increased by as much as two times over the natural strength of each magnet.

BRIEF DESCRIPTION OF THE DRAWINGS

The foregoing and other objects will become more readily apparent by referring to the following detailed description and the appended drawings in which.

DETAILED DESCRIPTION

Figure 1:
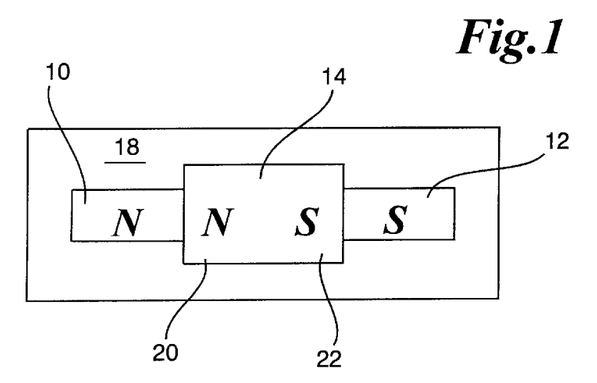
FIG. 1 is a top view of a preferred embodiment of the invention.

Referring now to the drawings, and particularly to FIG. 1, the invented magnetic fluid treatment device 8 includes a first elongated magnet 10 having a top and a bottom, the top having a north polarization. A second elongated magnet 14 has a top, a bottom, a first end 20, and a second end 22, wherein the first end 20 has a north polarization and the second end 22 has a south polarization. This first north end 20 of the second elongated magnet 14 abuts the first elongated magnet 10. A third elongated magnet 12 has a top and a bottom, the top having a south polarization. This third magnet 12 abuts the second end 22 of the second magnet 14. The magnets are made preferably from a neodymium alloy such as neodymium-iron-boron ($Nd_2Fe_{14}B$), but also can be made from selenium cobalt or samarium cobalt alloys. These magnets are preferably bonded or glued together. The second magnet 14 has a top with more surface area, FIG. 1, than the top of the first magnet 10 or third magnet 12. The magnetic field of magnet 14 is parallel to its long axis while the magnetic field of magnets 10 and 12 is parallel to their width axis.

Figure 2:
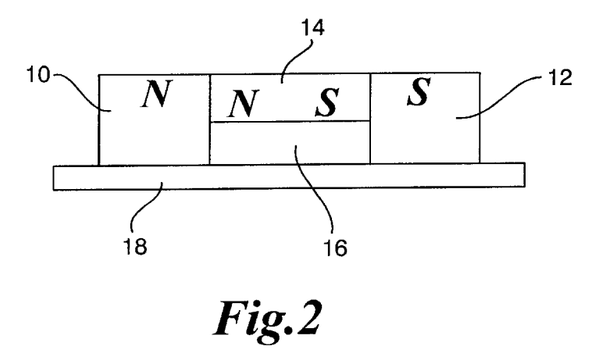
FIG. 2 is a front or rear view of the invented magnetic water treatment device as shown in FIG. 1.

In the preferred embodiment of the magnetic fluid treatment system, a spacer unit 16, FIG. 2, has a top, a bottom, a first end and a second end. This spacer is positioned so that top of the spacer unit 16 is in contact with the bottom of the second magnet 14. This first end of the spacer unit is in contact with the first magnet 10 and the second end of the spacer unit is in contact with the third magnet 12. An elongated member 18 having a top, and a bottom, is located under the unit. The top of the elongated member 18 is in contact with the bottom of the first magnet 10, the bottom of the spacer unit 16, and the bottom of the third magnet 12.

Figure 9:
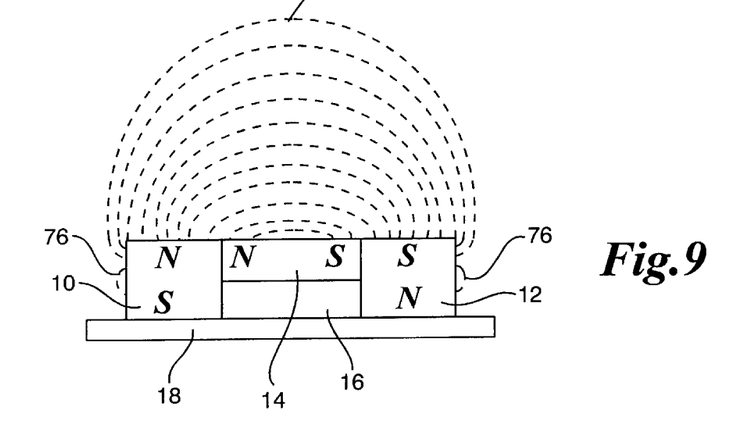
FIG. 9 is a front or rear view of the invented magnetic fluid treatment device as shown in FIG. 1 showing the magnetic field generated by the present invention.
Figure 10:
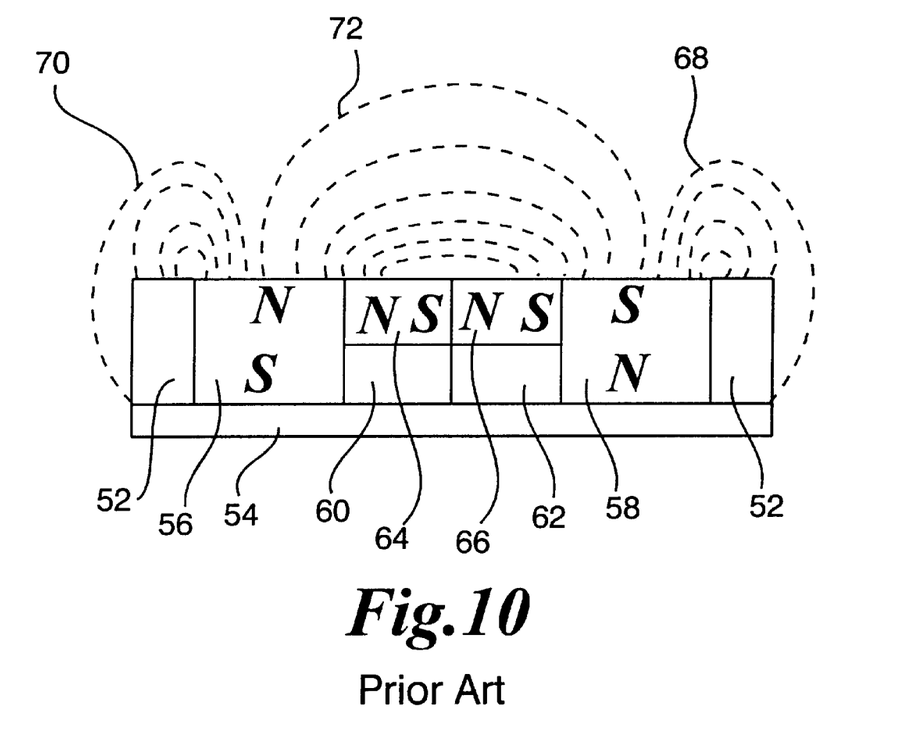
FIG. 10 is a front or rear view of a magnetic water treatment device of the Prior Art showing the magnetic field generated by the invention of the prior art.

The magnetic fluid treatment apparatus of the preferred embodiment also has an elongated member 18 having a top, and a bottom, where the top of this elongated member is in contact with the bottom of the first magnet and the bottom of the third magnet. This elongated member 18 is made from a magnetic material, and could be considered a pole piece. Elongated member 18 helps focus the magnetic field 74, FIG. 9, of the present invention where it effectively can be applied to liquid flowing through a pipe 74. It is clear from the prior art, FIG. 10, that the apparatus taught by this reference does not produce a single magnetic field across the surface of the magnets used. As shown in FIG. 9, the first, second and third magnet each have a planar surface, and together define a single, flush planar surface opposite the elongated member 18. While use of polar end pieces 52 did effectively focus magnet fields 68 and 70, it also had the effect of greatly diminishing magnet field 72.

The following derivation is presented to show that field length is as important to magnetic conditioning of fluids as field strength. The Lorentz force, F, is proportional to the charge on a particle, q, its velocity, V, and the size of the magnetic field, B.

$$F=qVB.$$

The impulse, I, change in momentum, of a particle due to a force, F, acting for some time, t, is:

$$I=Ft.$$

For a moving particle in a field the amount of time available for an interaction is the effective field length, d, divided by the velocity, V. i.e.:

$$t=d/V.$$

Therefore the impulse, I, and the velocity change, v, are:

$$I=Fd/V; v=I/m=qBd/m.$$

Kinetic energy is proportional to the mass, m, times the square of the velocity, V.

$$E=mV^2/2.$$

The additional energy, e, of a magnetically susceptible particle after an interaction with a field can be expressed as:

$$e = mv^2/2$$

because the additional velocity is perpendicular to the original velocity.

Substitution then provides the approximate relationship:

$$e = (qBd)^2/m.$$

The transfer of this energy is through molecular and atomic collisions. Clearly, the length of the field, d, as well as its strength, B, both are critical to this phenomena. Doubling the field length will be as effective as doubling the field strength.

As the neodymium alloy magnets are prone to oxidation, it is preferred that they be coated to inhibit oxidation. This process can be accomplished by electroplating the magnets, painting the magnets or encasing the magnets in resin. When the magnets are encased or encapsulated in resin, it is preferred that the resin encased magnets are protected by an elongated container 26 having a rectangular bottom 36, a pair of rectangular side walls 38 connected to the bottom 36, a pair of end pieces 40, connected to the bottom 36 and the rectangular side walls 38, having a top configured for mating with a round pipe 32. Each elongated container 26 has at least one retaining projection 34 for each rectangular side wall 38. These retaining projects have a first elongated member 42, which has a first end and a second end, the first end being integral and perpendicular to the side wall. A second elongated member 44 which has first end and a second end, is positioned so that the first end is perpendicular and integral with the second end of the first elongated member. The third elongated member 46 also has a first end and a second end. The first end is integral and perpendicular to the side wall 38. The second end of the third elongated 46 member is perpendicular to and integral with the second end of the second elongated member 44.

The elongated container 26 also may be fitted with a plurality of elongated spacers 28 having a first end and a second end, the first end being perpendicular and integral to the upper surface of the rectangular bottom. Further, the elongated container 26 may be fitted with at least one spacer such as L-shaped spacer 30 having a first elongated member 48 having a first end, a second end, and a third end. A second elongated member 50 has a first and second end. The first end of the first elongated member 48 is integral with the upper surface of the rectangular bottom 36. The second end of the first elongated member 48 is integral with the inside of the side wall 38. This first elongated member is perpendicular to both the rectangular bottom 36 and the side wall 38. The first end of the second elongated member 50 is integral with the third end of the first elongated member 48. Where the second end of the second elongated member 50 is integral with the upper surface of the rectangular bottom 36, the second elongated member is perpendicular to both the rectangular bottom 36 and the first elongated member 48.

With this elongated container 26, the magnetic fluid treatment device 8 is placed in the container so that the second end of the elongated spacer is in contact with the bottom of the elongated member 18 of magnetic fluid treatment device 8. The first elongated member of L shaped spacer 30 can either be in contact or spaced (a short distance) from elongated member 18. A resin such as, but not limited to acrylic, melamine, polyester, urethane or phenolic resin then can be poured into the elongated container 26 so that magnetic fluid treatment device 8 is completely submerged in the resin. The resin, which would contain an appropriate catalyst, then is allowed to harden. This encasement of the critical magnets 10, 12 and 14 inhibits oxidation.

In operation, the magnetic device 8 encased in hardened resin and the elongated container 26 then is mated to round fluid pipe so that top 32 is in contact with the fluid pipe. Straps are threaded through retaining projections 34 to firmly secure the entire assembly to the pipe. The magnetic field, FIG. 9, is projected through the resin and pipe wall where it has an effect on the flowing fluid.

ALTERNATIVE EMBODIMENTS

The strength, as measured by the gauss level, of the individual magnet can be varied from about 1000 gauss to the maximum capacity of the neodymium-iron-boron or samarium cobalt alloy. In the preferred embodiment, magnets have a minimum strength of at least 2000 gauss per magnet.

In the preferred embodiment, all of the magnets have the same dimensions. However, someone of skill in the art will recognize that these dimensions can be altered to optimize the magnetic field. The length and width of the device can be increased. However, it is preferable that the length to width ratio remains approximately constant.

One way to increase the width is to add additional end magnets having the same polar orientation to the ends. Therefore, one can have five magnets with the first two end magnets having a north polarization, then an intermediate magnet so that its north polarization end abuts one of the first two magnets and its south polarization end abuts the first of two south polarization end magnets. This orientation of magnets forms a planar surface having a single magnetic field across the entire surface. It will be apparent to anyone skilled in the art that any number of magnets can be used at either end and that the numbers can be different for each end. The important feature is that each end has the same polar orientation and that opposite ends have opposite polarization. Further, multiple intermediate magnets can be used in place of the single unit. As long as these magnets are aligned with opposite poles abutting the intermediate magnets and like poles aligned with like poles on the end magnets, it will result in a single magnetic field across the entire surface of the magnets of the apparatus will result.

Figure 3:
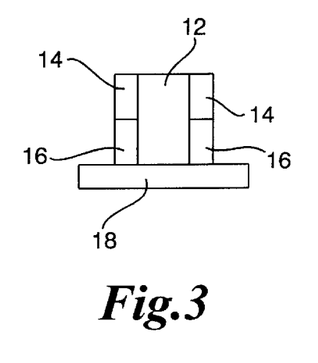
FIG. 3 is a side view of the invented magnetic water treatment device as shown in FIG. 1.
Figure 4:
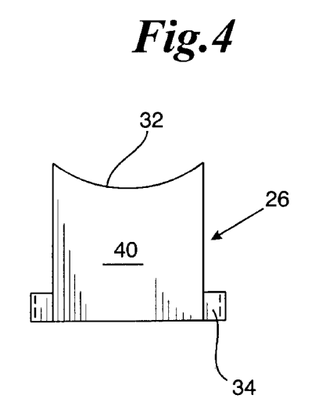
FIG. 4 is a side view of a protective cover for the invented magnetic water treatment device.
Figure 5:
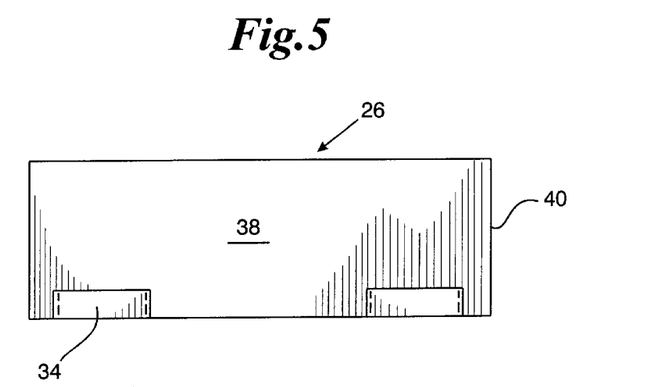
FIG. 5 is a front view of the protective cover for the invented magnetic water treatment device as shown in FIG. 4.
Figure 6:
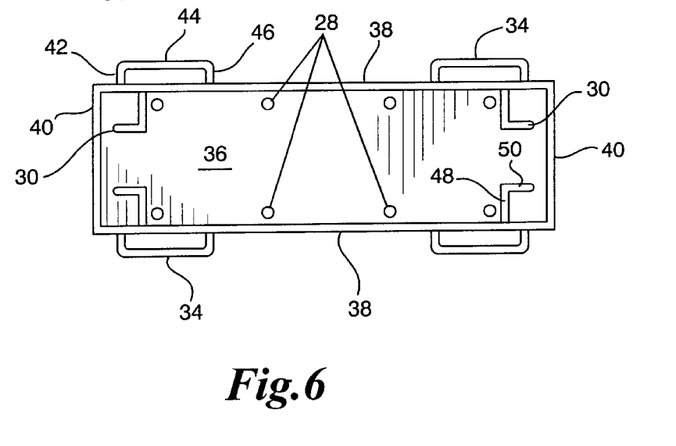
FIG. 6 is top view of the protective cover for the invented magnetic water treatment device as shown in FIG. 4.
Figure 7:
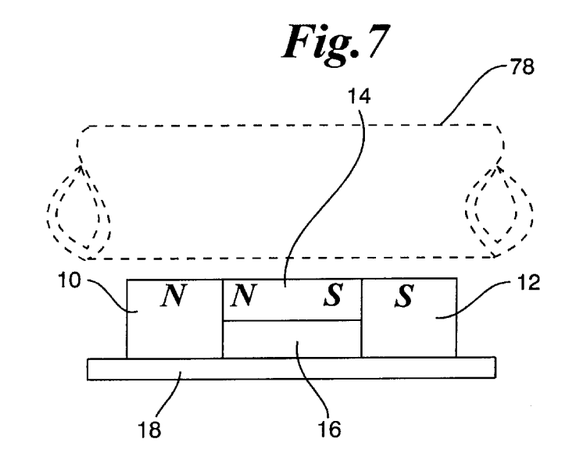
FIG. 7 is a front or rear view of the invented magnetic water treatment device as shown in FIG. 1 showing the spacial relationship of the side wall of a fluid pipe.
Figure 8:
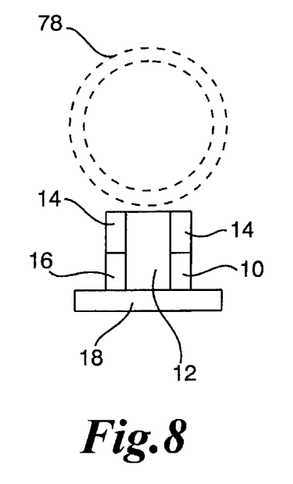
FIG. 8 is a side view of the invented magnetic water treatment device as shown in FIG. 1 showing the spacial relationship of the side wall of a fluid pipe.
Figure 11:
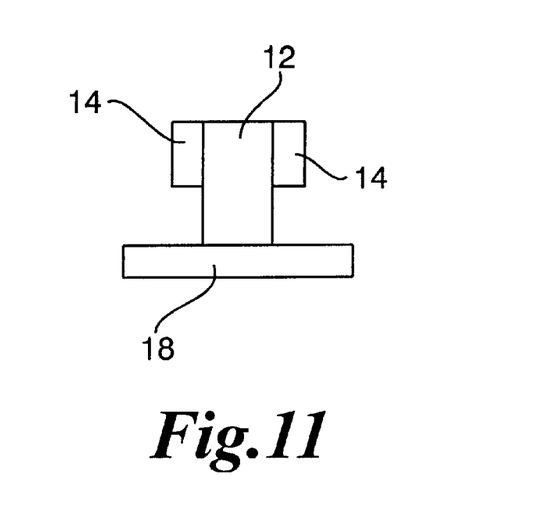
FIG. 11 is an alternative side view of the invented magnetic water treatment device as shown in FIG. 1.

The insert or spacer 16 can be of any material composition including neutral, diamagnetic and paramagnetic materials. This spacer 16 can either be the same width as magnet 14 as shown in FIG. 3, or it can be narrower as depicted in FIG. 11.

While water treatment is an important aspect of the present invention, it should be clear to those skilled in the art that any fluid stream which is capable of ionization can be affected by the present invention. Further, fluid as used throughout this application is defined as a substance that flows which includes gases, liquids, a bed of solids with a velocity high enough for the particles to separate from one another and become freely supported in a fluid, or any combination thereof.

SUMMARY OF THE ACHIEVEMENT OF THE OBJECTS OF THE INVENTION

From the foregoing, it is readily apparent that I have invented an improved method and apparatus for magnetic fluid treatment. A key to my invention is providing an apparatus which generates a magnetic field which is strong, focused, and of sufficient length so that the field can act on a moving solution. This apparatus uses multiple magnets because the resulting magnetic field can be focused, and the resulting strength of each magnet's magnetic field is increased by as much as two times over its natural strength.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A magnetic fluid treatment apparatus consisting of:
   an elongate, planar base member comprising a first end, a second end and a pair of opposed sides perpendicular to and extending between said first end and said second end;
   an arrangement of three magnets consisting of:
      a first magnet comprising a first end having a North polarization, a second end having a South polarization and a pair of opposed sides perpendicular to and extending between said first end and said second end, said second end of said first magnet abutting one of said opposed sides of said base member adjacent said first end of said base member, said first end of said first magnet defining a first planar surface perpendicular to and extending between said opposed sides of said first magnet;
      a second magnet comprising a first end having a North polarization, a second end having a South polarization and a pair of opposed sides perpendicular to and extending between said first end and said second end, said first end of said second magnet abutting one of said opposed sides of said first magnet adjacent said first end of said first magnet, one of said opposed sides of said second magnet defining a second planar surface; and
      a third magnet comprising a first end having a South polarization, a second end having a North polarization and a pair of opposed sides perpendicular to and extending between said first end and said second end, said second end of said third magnet abutting said one of said opposed sides of said base member adjacent said second end of said base member, one of said opposed sides of said third magnet abutting said second end of said second magnet, said first end of said third magnet defining a third planar surface perpendicular to and extending between said opposed sides of said third magnet; and
   a spacer positioned between said base member and said second magnet, said spacer comprising a first end, a second end and a pair of opposed sides perpendicular to and extending between said first end and said second end, said first end of said spacer abutting said one of said opposed sides of said first magnet adjacent said second end of said first magnet, said second end of said spacer abutting said one of said opposed sides of said third magnet adjacent said second end of said third magnet, one of said opposed sides of said spacer abutting said one side of said base member, the other of said opposed sides of said spacer abutting the other of the opposed sides of said second magnet.

2. The magnetic fluid treatment apparatus according to claim 1 wherein said first planar surface and said third planar surface are flush with said second planar surface so that said first planar surface, said second Dlanar surface and said third planar surface define a single planar surface opposite said one of said opposed sides of said base member.

3. The magnetic fluid treatment apparatus according to claim 1 wherein said spacer is made from a magnetic material.

4. The magnetic fluid treatment apparatus according to claim 1 wherein said spacer is made from a non-magnetic material.

5. A magnetic fluid treatment apparatus consisting of:
   an elongate, planar base member comprising a first end, a second end and a pair of opposed sides perpendicular to and extending between said first end and said second end;
   an arrangement of three magnets consisting of:
      a first magnet comprising a first end having a North polarization, a second end having a South polarization and a pair of opposed sides perpendicular to and extending between said first end and said second end, said second end of said first magnet abutting one of said opposed sides of said base member adjacent said first end of said base member, said first end of said first magnet defining a first planar surface perpendicular to and extending between said opposed sides of said first magnet;
      a second magnet comprising a first end having a North polarization, a second end having a South polarization and a pair of opposed sides perpendicular to and extending between said first end and said second end, said first end of said second magnet abutting one of said opposed sides of said first magnet adjacent said first end of said first magnet, one of said opposed sides of said second magnet defining a second planar surface; and
      a third magnet comprising a first end having a South polarization, a second end having a North polarization and a pair of opposed sides perpendicular to and extending between said first end and said second end, said second end of said third magnet abutting said one of said opposed sides of said base member adjacent said second end of said base member, one of said opposed sides of said third magnet abutting said second end of said second magnet, said first end of said third magnet defining a third planar surface perpendicular to and extending between said opposed sides of said third magnet;
   a first spacer positioned between said base member and said second magnet, said first spacer comprising a first end, a second end and a pair of opposed sides perpendicular to and extending between said first end and said second end, said first end of said first spacer abutting said one of said opposed sides of said first magnet adjacent said second end of said first magnet, said second end of said first spacer abutting said one of said opposed sides of said third magnet adjacent said second end of said third magnet, one of said opposed sides of said first spacer abutting said one side of said base member, the other of said opposed sides of said first spacer abutting the other of the opposed sides of said second magnet; and
   an elongate container for receiving said magnetic fluid treatment apparatus, said container comprising a bottom, a pair of side walls perpendicular to and depending outwardly from said bottom, and a pair of end walls perpendicular to and depending outwardly from said bottom and extending between said side walls.

6. The magnetic fluid treatment apparatus according to claim 5 wherein each of said side walls of said container defines an outside surface and an inside surface and wherein said container further comprises:
   at least one retaining projection depending outwardly from the outside surface of each of said side walls, said at least one retaining projection comprising:
      a first elongate member perpendicular to said side wall and having a first end and a second end, said first end integral with said side wall;

a second elongate member perpendicular to said first elongate member and having a first end and a second end, said first end integral with said second end of said first elongate member; and a third elongate member perpendicular to said side wall and having a first end and a second end, said first end integral with said side wall, said second end integral with said second end of said second elongate member; and a strap, said strap cooperating with said at least one projection to secure said magnetic fluid treatment apparatus to a pipe.

7. The magnetic fluid treatment apparatus according to claim 5 wherein each of said side walls of said container defines an outside surface and an inside surface and wherein said container further comprises:

at least one retaining projection depending outwardly from the outside surface of each of said side walls, said retaining projection comprising a tab integral with said side wall and having an aperture therethrough; and a strap, said strap cooperating with said at least one projection to secure said magnetic fluid treatment apparatus to a pipe.

8. The magnetic fluid treatment apparatus according to claim 5 wherein said bottom of said container defines an upper surface and a lower surface and wherein said container further comprises:

a plurality of second spacers perpendicular to the upper surface of said bottom and having a first end and a second end, said first end integral with said bottom of said container.

9. The magnetic fluid treatment apparatus according to claim 5 wherein said container further comprises:

at least one L-shaped third spacer comprising
a first elongate member perpendicular to said bottom and having a first end and a second end, said first end integral with one of said side walls; and
a second elongate member perpendicular to said bottom and having a first end and a second end, said first end integral with said second end of said first elongate member.

10. The magnetic fluid treatment apparatus according to claim 5 wherein said first magnet, said second magnet and said third magnet are encapsulated in resin.

11. The magnetic fluid treatment apparatus according to claim 1 wherein each of said first magnet, said second magnet and said third magnet has a minimum strength of 1000 gauss.

12. The magnetic fluid treatment apparatus according to claim 1 wherein said first magnet, said second magnet and said third magnet are glued together to fix their orientation relative to each other.

13. The magnetic fluid treatment apparatus according to claim 1 wherein at least one of said first magnet, said second magnet and said third magnet are made from a material selected from the group consisting of neodymium alloy, samarium cobalt alloy, selenium cobalt alloy and combinations thereof.

14. The magnetic fluid treatment apparatus according to claim 13 wherein said neodymium alloy is neodymium-iron-boron.

15. The magnetic fluid treatment apparatus according to claim 1 wherein the area of said second planar surface is greater than the area of said first planar surface.

16. The magnetic fluid treatment apparatus according to claim 1 wherein the area of said second planar surface is greater than the area of said third planar surface.

17. The magnetic fluid treatment apparatus according to claim 1 wherein said first magnet, said second magnet and said third magnet have equal dimensions.

18. A method for treating a fluid with magnetism, said method comprising the steps of:

providing a magnetic fluid treatment apparatus consisting of:

an elongate, planar base member comprising a first end, a second end and a pair of opposed sides perpendicular to and extending between said first end and said second end;

an arrangement of three magnets consisting of:

a first magnet comprising a first end having a North polarization, a second end having a South polarization and a pair of opposed sides perpendicular to and extending between said first end and said second end, said second end of said first magnet abutting one of said opposed sides of said base member adjacent said first end of said base member, said first end of said first magnet defining a first planar surface perpendicular to and extending between said opposed sides of said first magnet;

a second magnet comprising a first end having a North polarization, a second end having a South polarization and a pair of opposed sides perpendicular to and extending between said first end and said second end, said first end of said second magnet abutting one of said opposed sides of said first magnet adjacent said first end of said first magnet, one of said opposed sides of said second magnet defining a second planar surface; and a third magnet comprising a first end having a South polarization, a second end having a North polarization and a pair of opposed sides perpendicular to and extending between said first end and said second end, said second end of said third magnet abutting said one of said opposed sides of said base member adjacent said second end of said base member and one of said opposed sides of said third magnet abutting said second end of said second magnet, said first end of said third magnet defining a third planar surface perpendicular to and extending between said opposed sides of said third magnet; and a spacer positioned between said base member and said second magnet, said spacer comprising a first end, a second end and a pair of opposed sides perpendicular to and extending between said first end and said second end, said first end of said spacer abutting said one of said opposed sides of said first magnet adjacent said second end of said first magnet, said second end of said spacer abutting said one of said opposed sides of said third magnet adjacent said second end of said third magnet, one of said opposed sides of said spacer abutting said one side of said base member, the other of said opposed sides of said spacer abutting the other of the opposed sides of said second magnet; and positioning said magnetic fluid treatment apparatus against a pipe through which fluid to be treated flows thereby creating a magnetic field across the interior of the pipe to treat the flowing fluids wherein said method does not include any further step of providing additional magnets to said magnetic fluid treatment apparatus.

19. The method for treating a fluid with magnetism according to claim 18 wherein the step of positioning comprises the further step of securing the magnetic fluid treatment apparatus against the pipe.

* * * * *